April 20, 1948.     J. J. KROB     2,439,937
FRICTION SHOCK ABSORBING MECHANISM
Filed Aug. 28, 1944
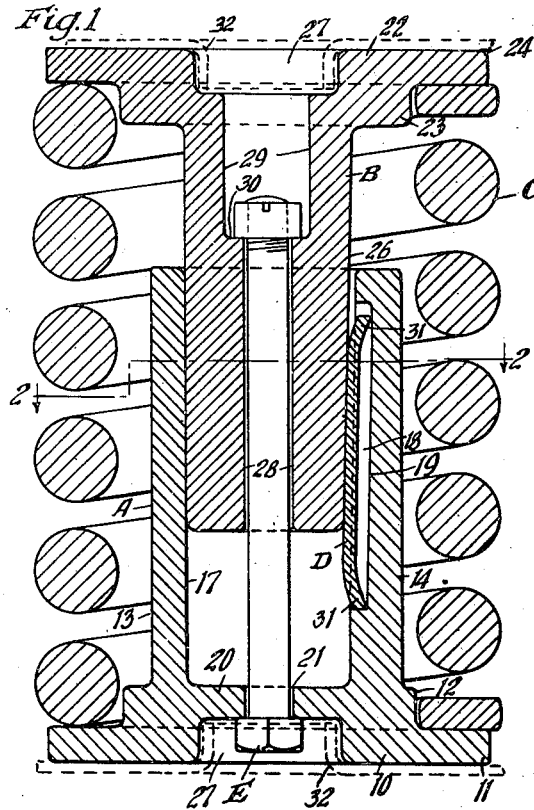
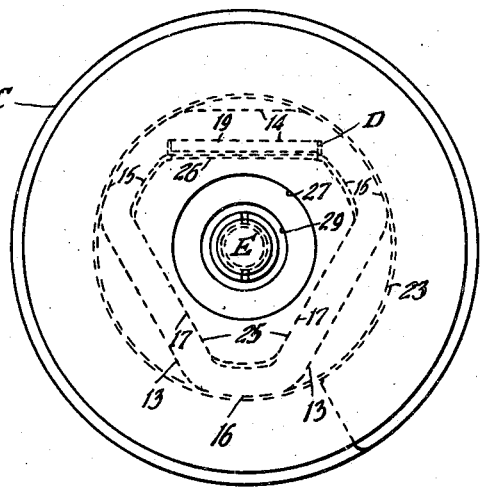
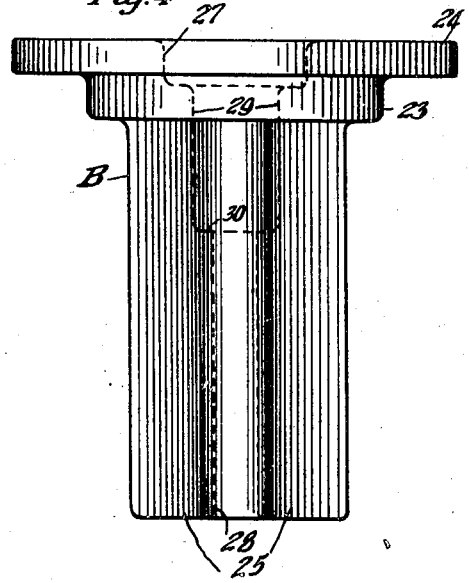
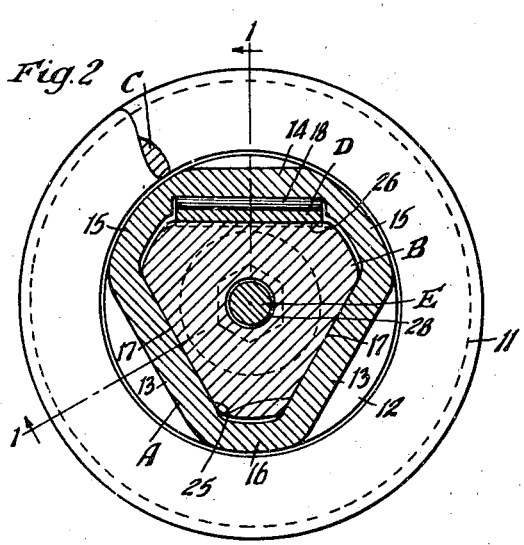
Inventor
Joseph J. Krob
By Henry Fuchs
Atty.

Patented Apr. 20, 1948

2,439,937

UNITED STATES PATENT OFFICE 2,439,937

FRICTION SHOCK ABSORBING MECHANISM

Joseph J. Krob, Chicago, Ill., assignor to W. H. Miner, Inc., Chicago, Ill., a corporation of Delaware Application August 28, 1944, Serial No. 551,482

6 Claims. (Cl. 267—9)

1

This invention relates to improvements in friction shock absorbing mechanisms, especially adapted for snubbing the action of truck springs of railway cars.

One object of the invention is to provide a friction shock absorbing mechanism of the character indicated comprising a friction casing; a friction post slidingly telescoped within the friction casing; and spring means yieldingly opposing relative movement of the post and casing in the lengthwise direction, wherein the post is pressed into tight frictional engagement with certain of the interior walls of the casing by spring means reacting between the post and a remaining wall of the casing opposed to the walls with which the post has sliding engagement.

Other objects of the invention will more clearly appear from the description and claims hereinafter following.

In the drawing forming a part of this specification, Figure 1 is a vertical sectional view of my improved shock absorbing mechanism, the section being on two intersecting vertical planes at an angle of 120 degrees to each other, corresponding substantially to the line 1—1 of Figure 2. Figure 2 is a horizontal sectional view, corresponding substantially to the line 2—2 of Figure 1. Figure 3 is a top plan view of Figure 1. Figure 4 is a side elevational view of the friction post of my improved mechanism.

As shown in the drawing, my improved shock absorbing mechanism comprises broadly a friction casing A; a friction post B; an outer spring C; a plate spring D for pressing the post against the friction surfaces of the casing; and a retainer bolt E.

The friction casing A is in the form of a tubular member of substantially triangular, transverse cross section having a disclike base 10 at its lower end. At the periphery, the disclike base member 10 presents an annular flange 11 on which the lower end of the outer spring C is adapted to bear. At the center thereof, the disclike base portion 10 is provided with an upstanding, substantially cylindrical boss 12, which is formed integral with the walls of the tubular portion of the casing. Two of the walls of the casing which extend vertically are indicated by 13—13 and present longitudinally extending, interior friction surfaces 17—17, which are disposed at an angle of 60 degrees to each other, transversely of the mechanism. The third wall of the casing, which is indicated by 14, is slightly inclined to the vertical, that is, is inclined upwardly and away from the central vertical axis of the

2 casing. The wall 14, which is disposed at angles of 60 degrees to the walls 13—13 respectively, is of greater thickness than the latter. The wall 14 is connected to the walls 13—13 by short, rounded wall portions 15—15. A slightly rounded wall portion 16 connects the walls 13—13 at the converging sides of the same, as clearly shown in Figure 2. The wall 14 is provided with an interior, longitudinally extending spring seat 18 of rectangular shape, which opens inwardly of the casing and faces the walls 13—13. The back wall of the seat, which wall is indicated by 19, is correspondingly inclined to the inner, longitudinal surface of the wall 14 of the casing. The casing is closed at the bottom by a transverse, horizontal wall 20, which has a central opening 21 adapted to accommodate the retainer bolt E.

The friction post B is slidingly telescoped within the casing A and is provided with a heavy disclike follower plate member 22 at the upper end thereof. The follower plate 22 has a depending, central, cylindrical boss 23 from which the post projects. At the periphery thereof, the disclike follower plate 22 is provided with an annular, outstanding flange 24, which opposes the flange 11 of the casing and forms a follower portion with which the upper end of the spring C is engaged. The post B is broadly of triangular, transverse cross section, two adjacent sides of the same presenting longitudinally extending, flat friction surfaces 25—25 which engage the friction surfaces 17—17 of the walls 13—13 of the casing A. The remaining or third side of the post presents a flat friction surface 26 which is correspondingly inclined to the wall 14 of the casing and is slightly spaced therefrom, as clearly shown in Figure 1. The corners of the post are rounded off to correspond with the rounded corners of the casing. The disclike follower plate 22 of the post B and the base 10 of the casing A are provided with outwardly opening, central seats 27—27 adapted to receive the usual spring centering projections 32—32 of the top and bottom spring follower plates, shown in dotted lines in Figure 1, of a spring cluster of a railway car truck. To accommodate the retainer bolt E, the post B is provided with a central, longitudinally extending opening or bore 28, said opening 28 being diametrically enlarged at its upper end, as indicated at 29, thereby providing an annular abutment shoulder 30 at the bottom of said enlarged portion of the opening, which shoulder serves as a stop member cooperating with the retainer bolt E.

The bolt E serves to anchor the post B to the casing A, thus limiting relative lengthwise separation of the parts of the mechanism and holding the same assembled and of uniform overall length. The bolt E extends through the openings 21 of the wall 20 of the casing and opening 28 of the post B, with its head shouldered against the wall 20 of the casing A and the nut thereof accommodated in the enlarged portion 29 of the opening 28 and in abutment with the shoulder 30 of the post.

The spring D is in the form of a substantially flat, rectangular plate and is disposed within the seat 18. The opposite ends 31—31 of the spring D are bowed or bent outwardly away from the post and bear on the back wall 19 of the seat 18 to maintain the main body portion of the plate in substantial parallelism with the inclined friction surface 26 of the post and in flat bearing engagement therewith. The plate spring D is of lesser length than the seat 18 to provide clearance to accommodate flattening out of the plate as the post B is forced inwardly of the casing A, that is, to take care of the taper of the post as the mechanism is compressed.

In the assembled condition of the mechanism, the plate spring D is under initial compression to force the post against the friction surfaces of the casing.

The spring C is in the form of an elongated, helical coil surrounding the casing A and the post B and bearing at its top and bottom ends on the follower flanges 24 and 11 of the disclike follower members of the post and casing. This spring is preferably under initial compression in the assembled condition of the mechanism, the retainer bolt E being properly adjusted for this purpose.

My improved friction shock absorbing mechanism or snubber is substituted for one or more of the spring units of a truck spring cluster of a railway car, being interposed between the top and bottom spring plates of said cluster.

The operation of my improved snubber is as follows: Upon the cluster of springs of the railway car truck being compressed between the spring follower plates of the truck springs, the friction post B and the casing A are moved toward each other, lengthwise of the mechanism, against the resistance of the spring C, the friction surfaces 25—25 of the post B sliding on the friction surfaces 17—17 of the casing A, against which they are pressed by the plate spring D, and the friction surface 26 sliding on the plate spring D. Frictional resistance to relative movement of the post and casing is thus provided between the three friction surfaces of the post and the friction surfaces of the casing and spring D, thus snubbing the action of the truck springs. The frictional resistance progressively increases during compression of the mechanism, due to the wedging action provided by the contacting inclined surfaces of the post B and the plate spring D; in other words, due to the post B being tapered.

Upon the spring follower plates being moved apart, during recoil of the truck springs, the expansive action of the spring C restores all the parts to their normal position, separation of the post and casing in lengthwise direction being limited by the retainer bolt E. In this connection it is pointed out that the frictional resistance between the post B and the casing A and plate spring D is also effective during recoil of the truck springs to snub the action of the same. The resistance is progressively decreased, as the mechanism expands, due to the tapered arrangement of the parts.

I claim:

1. In a friction shock absorbing mechanism, the combination with a friction casing having two longitudinally extending, laterally outwardly converging, interior friction surfaces, and a longitudinally extending wall opposed to said converging surfaces; of a friction post telescoped within the casing and having lengthwise extending, flat friction surfaces at one side thereof slidingly engaging said casing surfaces; a spring seat in said wall of the casing; a plate spring in said seat pressing against the post to force the same against the friction surfaces of the casing; and spring means yieldingly opposing lengthwise relative movement of the post and casing toward each other.

2. In a friction shock absorbing mechanism, the combination with a friction casing having two longitudinally extending, laterally outwardly converging, interior friction surfaces, and a longitudinally extending wall opposed to said converging surfaces; of a friction post telescoped within the casing and having lengthwise extending, flat friction surfaces at one side thereof slidingly engaging said casing surfaces; a plate spring bearing on said wall of the casing and the corresponding side of the post and reacting between said post and casing for pressing the post against the friction surfaces of the casing; and spring means yieldingly opposing lengthwise relative movement of the post and casing toward each other.

3. In a friction shock absorbing mechanism, the combination with a friction casing having two longitudinally extending, laterally outwardly converging, interior friction surfaces, and a longitudinally extending wall opposed to said converging surfaces; of a friction post telescoped within the casing, said post having two longitudinally extending, laterally outwardly converging, exterior friction surfaces slidably engaging the friction surfaces of the casing, and a third longitudinally extending friction surface at the side thereof opposite to said first named surfaces; a plate spring interposed and reacting between said third friction surface of the post and said wall of the casing to force the post against said casing friction surfaces; and spring means yieldingly opposing lengthwise relative movement of the post and casing toward each other.

4. In a friction shock absorbing mechanism, the combination with a friction casing having two laterally outwardly converging, longitudinally extending, interior friction surfaces parallel to the central longitudinal axis of the mechanism, and a longitudinally extending wall opposed to said converging surfaces; of a plate spring mounted on said wall, said plate spring presenting a flat friction surface extending lengthwise of the casing and inclined to said central axis of the casing inwardly of the latter; a friction post telescoped within the casing and having a pair of longitudinally extending friction surfaces engaging the friction surfaces of the casing, and a third friction surface correspondingly inclined to and engaging the friction surface of the plate spring; and spring means yieldingly opposing relative lengthwise movement of the post and casing toward each other.

5. In a friction shock absorbing mechanism, the combination with a friction casing having two laterally outwardly converging, longitudinally extending, interior friction surfaces parallel to the central longitudinal axis of the mechanism, and a longitudinally extending wall opposed to said converging surfaces; of a plate spring mounted on said wall; a friction post telescoped within the casing and having a pair of longitudinally extending friction surfaces engaging the friction surfaces of the casing, and a third friction surface inclined with respect to the central longitudinal axis of the mechanism and slidably engaging said plate spring; and spring means yieldingly opposing relative lengthwise movement of the post and casing toward each other.

6. In a friction shock absorbing mechanism, the combination with a tubular friction casing; of a friction post telescoped within the casing in lengthwise sliding relation thereto, said post having sliding frictional engagement with the interior of the casing at one side thereof; an interior spring pocket in the wall of the casing at the opposite side thereof; a plate spring seated in said pocket and having flat engagement with the post, said plate spring pressing the post into frictional engagement with the casing; and a main spring resistance yieldingly opposing relative lengthwise movement of the post and casing toward each other.

JOSEPH J. KROB.

REFERENCES CITED

The following references are of record in the file of this patent:

UNITED STATES PATENTS

| Number | Name | Date |
|---|---|---|
| 557,487 | Canet | Mar. 31, 1896 |
| 1,167,848 | Sears | Jan. 11, 1916 |
| 1,745,033 | Smith | Jan. 28, 1930 |
| 2,197,783 | Barrows | Apr. 23, 1940 |
| 2,198,261 | Barrows et al. | Apr. 23, 1940 |

FOREIGN PATENTS

| Number | Country | Date |
|---|---|---|
| 198,748 | Germany | May 23, 1908 |
| 526,264 | Great Britain | Sept. 13, 1940 |
| 850,833 | France | Sept. 18, 1939 |